(12) United States Patent
Bucknor et al.

(10) Patent No.: US 8,414,437 B2
(45) Date of Patent: Apr. 9, 2013

(54) HYBRID TRANSMISSION WITH SYNCHRONOUS SHIFT BETWEEN SERIES AND COMPOUND-SPLIT OPERATING MODES

(75) Inventors: Norman K. Bucknor, Troy, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 290 days.

(21) Appl. No.: 12/720,721

(22) Filed: Mar. 10, 2010

(65) Prior Publication Data

US 2011/0224042 A1 Sep. 15, 2011

(51) Int. Cl.
- *F16H 3/72* (2006.01)
- *F16H 37/06* (2006.01)
- *F16H 3/44* (2006.01)

(52) U.S. Cl. .......................... 475/5; 475/286; 180/65.225

(58) Field of Classification Search .............. 475/5, 271, 475/286, 317, 323
See application file for complete search history.

(56) References Cited

U.S. PATENT DOCUMENTS

| | | | |
|---|---|---|---|
| 6,527,658 B2 | 3/2003 | Holmes et al. | |
| 7,108,087 B2 * | 9/2006 | Imai | 180/65.23 |
| 7,128,675 B2 * | 10/2006 | Klemen et al. | 475/5 |
| 7,727,100 B2 * | 6/2010 | Bucknor et al. | 475/5 |
| 2009/0082171 A1 | 3/2009 | Conlon et al. | |

* cited by examiner

*Primary Examiner* — David D Le
*Assistant Examiner* — Colby M Hansen
(74) *Attorney, Agent, or Firm* — Quinn Law Group, PLLC

(57) ABSTRACT

A hybrid transmission is provided that is configured to shift between the hybrid series operating mode and the compound-split operating mode synchronously, without slipping any torque-transmitting mechanisms. The transmission includes an input member operatively connected with the engine, an output member, and a plurality of selectively engageable torque-transmitting mechanisms. A gearing arrangement and first and second motor/generators operatively connected with the gearing arrangement are also provided. A first of the torque-transmitting mechanisms is engaged to establish a hybrid series operating mode between the input member and the output member, and a second of the torque-transmitting mechanisms is engaged to establish a compound-split operating mode between the input member and the output member. The shift between the hybrid series operating mode and the compound-split operating mode is synchronous without slipping the torque-transmitting mechanisms and occurs while the engine is on.

15 Claims, 4 Drawing Sheets

HYBRID TRANSMISSION WITH SYNCHRONOUS SHIFT BETWEEN SERIES AND COMPOUND-SPLIT OPERATING MODES

TECHNICAL FIELD

The invention relates to a hybrid transmission having both a series and a compound-split operating mode.

BACKGROUND OF THE INVENTION

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and a hybrid operating mode are established by engaging brakes and/or clutches in different combinations and controlling the engine and motor/generators. The various operating modes are advantageous, as they may be used to improve fuel economy. However, the additional components required for a hybrid powertrain, such as the motor/generators, brakes and/or clutches, may increase overall vehicle cost and packaging space requirements.

SUMMARY OF THE INVENTION

A hybrid transmission is provided that is configured to shift between the hybrid series operating mode and the compound-split operating mode synchronously, without slipping any torque-transmitting mechanisms. The transmission includes an input member operatively connected with the engine, an output member, and a plurality of selectively engageable torque-transmitting mechanisms. A gearing arrangement and first and second motor/generators operatively connected with the gearing arrangement are also provided. A first of the torque-transmitting mechanisms is engaged to establish a hybrid series operating mode between the input member and the output member, and a second of the torque-transmitting mechanisms is engaged to establish a compound-split operating mode between the input member and the output member. The shift between the hybrid series operating mode and the compound-split operating mode is synchronous without slipping the torque-transmitting mechanisms and occurs while the engine is on. As used herein, "synchronously" means without substantial slip of any of the torque-transmitting mechanisms, so that disengagement of one or more torque-transmitting mechanisms and engagement of one or more other torque-transmitting mechanisms can be commanded by the controller at essentially the same time. Feedback of the state of engagement or disengagement of the clutches during the shift is not essential, as in a controlled slip situation, thus simplifying the clutch control algorithm and hydraulic feed system.

The compound-split operating mode may be used during high vehicle speeds to minimize the electrical losses associated with the series operation, especially with the motors at high speed. Because the compound-split mode utilizes the planetary gear sets, the motors may operate at a relatively low speed. By enabling a synchronous shift and avoiding slip, either mode can be easily selected and losses are minimized. The shift takes place at a transmission torque ratio corresponding to the fixed gear point, where it is possible for essentially all of the power from input to output to be transmitted mechanically and no substantial power is transmitted electrically.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
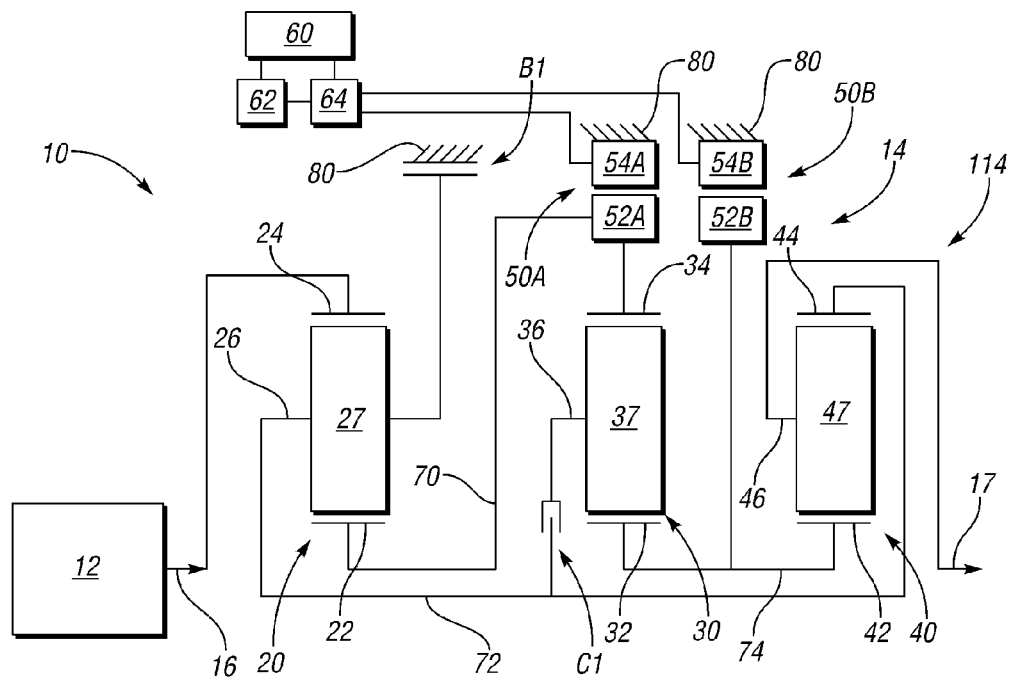
FIG. 1 is a schematic stick diagram illustration of a first embodiment of a hybrid powertrain.

Referring to the drawings, FIG. 1 shows a hybrid powertrain 10 that includes an engine 12 operatively connected to a hybrid transmission 14. An engine output member, such as a crankshaft, is operatively connected for rotation with an input member 16 of the transmission 14. As used herein, an "engine" includes any power source connected for providing torque at the input member 16 that is not powered by the electrical power stored in battery 60. For example, an engine includes an internal combustion engine, a diesel engine, a rotary engine, etc. The powertrain 10 is operable to provide tractive torque at an output member 17 of the transmission 14 in both a series hybrid operating mode and a compound-split hybrid operating mode, as discussed below.

The transmission 14 has three planetary gear sets 20, 30 and 40, each of which is a simple planetary gear set. Planetary gear set 20 has a sun gear member 22, a ring gear member 24 and a carrier member 26. Pinion gears 27 rotatably supported on carrier member 26 mesh with both the ring gear member 24 and the sun gear member 22. Planetary gear set 30 has a sun gear member 32, a ring gear member 34 and a carrier member 36. Pinion gears 37 rotatably supported on carrier member 36 mesh with both the ring gear member 34 and the sun gear member 32. Planetary gear set 40 has a sun gear member 42, a ring gear member 44 and a carrier member 46. Pinion gears 47 rotatably supported on carrier member 46 mesh with both the ring gear member 44 and the sun gear member 42. The input member 16 is continuously connected for common rotation with the ring gear member 24. The output member 17 is continuously connected for common rotation with the carrier member 46.

The transmission includes a first motor/generator 50A and a second motor/generator 50B. Motor/generator 50A has a rotor 52A connected for common rotation with ring gear member 34 and a stator 54A grounded to a stationary member 80 such as a transmission casing. Second motor/generator 50B has a rotor 52B and a stator 54B. Stator 54B is grounded to the stationary member 80. An energy storage device, such as a battery 60, is operatively connected by transfer conductors to the stators 54A, 54B. A controller 62 controls electrical transfer between the battery 60 and the stators 54A, 54B through a power inverter 64 that changes direct current provided by the battery to alternating current required for operation of the motor/generators 50A, 50B (and vice versa when the motor/generators 50A, 50B are operable as generators).

Sun gear member 22 and ring gear member 34 are continuously connected for common rotation with one another and with the rotor 52A by an interconnecting member 70. Carrier member 26 is continuously connected for common rotation with ring gear member 44 by interconnecting member 72. Sun gear members 32, 42 are connected for common rotation by interconnecting member 74. A rotor hub of rotor 52B is also connected for common rotation with interconnecting member 74 so that sun gear members 32 and 42 rotate at the same speed as the rotor 52B.

The transmission 14 includes only two torque transmitting mechanisms. A brake B1 is selectively engageable to ground the carrier member 26 to the stationary member 80. Clutch C1 is selectively engageable to connect the interconnecting member 72, and thereby the carrier member 26 and the ring gear member 44, for common rotation with the carrier member 36. By controlling the motor/generators 50A, 50B, the clutch C1 and the brake B1, three different operating modes are available for forward propulsion. The motor/generators 50A, 50B may also capture braking energy in a regenerative braking mode and be controlled to start the engine 12 either from a cold start or from a stop/start (i.e., when temporarily shut off while the vehicle is being operated in another mode).

A series operating mode is established by engaging brake B1, not engaging clutch C1 (i.e., disengaging it if previously engaged), controlling motor/generator 50A to function as a generator, and controlling motor/generator 50B to function as a motor. With brake B1 engaged, carrier member 26 and ring gear member 44 are stationary. Torque from the engine 12 is supplied to the rotor 52A at a gear ratio established by the planetary gear set 20. The torque is converted to electrical energy stored in the battery 60 or transmitted directly to the motor/generator 50B via 64 to power motor/generator 50B to function as a motor, providing torque at the sun gear member 42. The torque is multiplied through the planetary gear set 40 and provided at the output member 17. Because carrier member 36 is not connected to any other member or to the stationary member, planetary gear set 30 is inactive in the series operating mode.

A series operating mode requires two groups of gear members arranged so that the rotational speeds of the second group are determined by electrical power provided to a motor/generator connected to a member of the second group. The first group connects the engine 12 with the first motor/generator 50A, and the second group connects the second motor/generator 50B with the output member 17. A series operating mode is beneficial because there is no purely mechanical power flow path between the engine 12 and the output member 17. Thus, spin losses and the disruption in output torque to restart the engine 12 using the motor/generators 50A, 50B are lower. In the series operating mode, the first group of gear members includes those gear members providing a power flow path from the engine 12 to the motor/generator 50A (i.e., ring gear member 24, carrier member 26, and interconnected sun gear member 22 and ring gear member 34). The second group of gear members includes those gear members providing a power flow path from the second motor/generator 50B to the output member 17 (i.e., interconnected sun gear members 32, 42, carrier member 46, ring gear member 44, and carrier member 36 (which spins freely in the series operating mode)). Furthermore, in order to keep motor size relatively small, the motor/generator 50B that drives the output member 17 in the series mode should have a geared ratio to the output member 17. This requires a grounded member, in this case ring gear member 44.

A compound-split operating mode is provided when clutch C1 is engaged and brake B1 is not engaged (i.e., disengaging it if previously engaged). A compound-split operating mode is beneficial for efficient operation during high-speed driving, as it allows for reduced motor speeds and decreased power through the electrical power path. That is, all of the mechanical power is not converted to electrical power, then converted again to mechanical power through the motor/generators 50A, 50B as is the case in the series operating mode.

A compound-split operating mode requires four planetary gear members that are not connected for common rotation with one another but that are connected with one another through differential gearing (i.e., one member (ring gear member 24) connected for rotation with the input member 16, a member (interconnected members 22, 34) connected for rotation with the motor/generator 50A, a member (interconnected sun gear members 32, 42) connected for rotation with the motor/generator 50B, and a member (carrier member 46) connected for rotation with the output member 17). A fifth member, the carrier member 36, is not connected with any other gear set member in the series operating mode, and thus helps to separate the four required members into a first group and a second group as is necessary in the series operating mode as described above. Clutch C1 can then be engaged to transition to the compound-split operating mode so that the members 26, 36, and 44 are interconnected to function as a single fifth member, and are available to be grounded during a shift to the series operating mode, while still allowing the other four members to be moving, as is required for the series operating mode, thus satisfying the requirement of the compound-split operating mode that there be four members interconnected by differential gearing.

In the compound-split operating mode, the engine 12 provides torque at the ring gear member 24 and the motor/generator 50A provides torque to or receives torque from the sun gear member 22 and ring gear member 34. The torque from the engine 12 and the motor/generator 50A is combined through the planetary gear set 20 to flow to the interconnected carrier member 26, carrier member 36 and ring gear member 44. Torque is provided from or to the motor/generator 50B at the interconnected sun gear members 32, 42. Torque from the engine 12 provided at ring gear member 44 and torque received from or provided to the motor/generator 50B at the sun gear member 42 is split through planetary gear set 40 to provide torque at the carrier member 46 and output member 17. Thus, the torque is split at planetary gear set 20 (input-split) and split again at planetary gear set 40 (output-split), making the operating mode a compound-split operating mode.

A switch from the series operating mode to the compound-split operating mode can occur with a synchronous shift of clutch C1 and brake B1 by controlling the motor/generator 50A to bring the speed of carrier member 36 to the same speed as carrier member 26 (which is a speed of zero in the series operating mode). The gear members that are at zero speed (carrier member 26 and carrier member 36) must be different than the four gear members required for series operation, as all of those gear members must be rotating in the series operating mode. Clutch C1 can then be engaged while brake B1 is released. There is no need to slip clutch C1 as there is no speed differential between the carrier members 26, 36. Thus, there are no mechanical losses due to slipping.

Furthermore, clutch C1 can be engaged at this synchronous speed while B1 remains engaged, establishing a fixed ratio operating mode. For example, if the ring gear member to sun gear member ratios of planetary gear sets 20 and 30 are 1.5 and the ring gear member to sun gear member ratio of planetary gear set 40 is 2.0, then if both clutch C1 and brake B1 are engaged, a fixed gear ratio of 1.55 will result between the input member 16 and the output member 17.

When brake B1 is engaged, if the engine is stopped, the motor/generator 50A can be controlled to operate as a motor to start the engine 12. Because clutch C1 is not engaged, planetary gear set 30 is inactive (does not carry torque) and torque is not transferred to the output member 17 while the engine 12 is being started.

During both the series operating mode and the compound-split operating mode, the motor/generator 50B can be controlled to operate as a generator to convert some of the torque at the output member 17 to electrical energy during vehicle braking.

Figure 2:
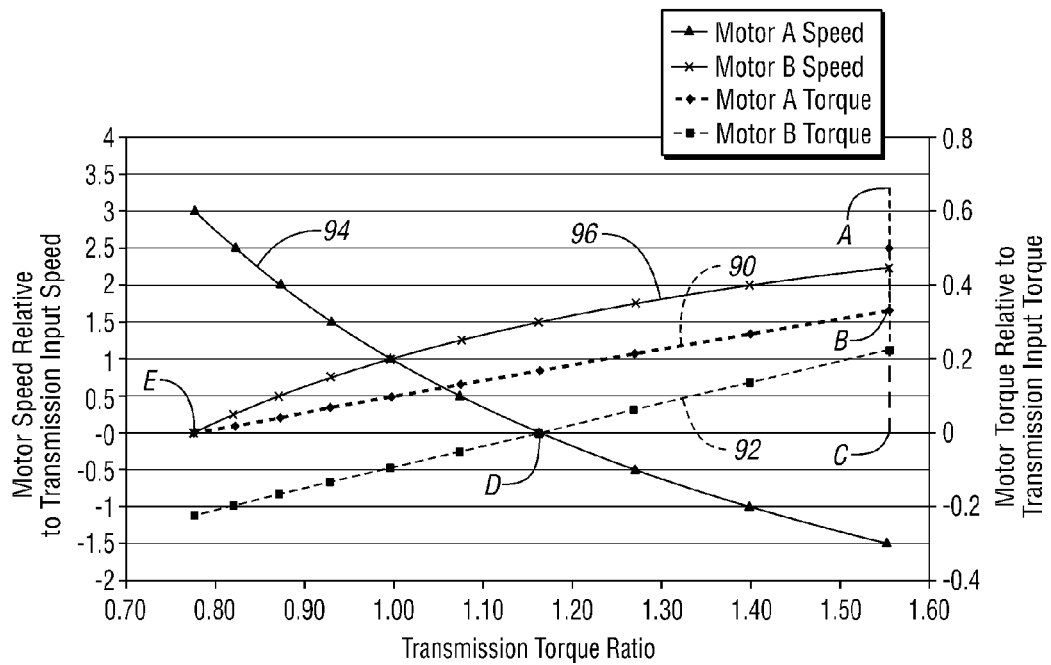
FIG. 2 is a chart of the ratio of motor speed and torque to transmission input and torque versus transmission torque ratio for the powertrain of FIG. 1.

Referring to FIG. 2, the compound-split operating mode is illustrated with the relationship between the ratio of the torque of motor/generator 50A (Motor A) to the torque of the input member 16 versus the ratio of torque of the input member 16 to torque of the output member 17 illustrated as curve 90. The relationship between the ratio of the torque of motor/generator 50B (Motor B) to the torque of the input member 16 versus the ratio of torque of the input member 16 to torque of the output member 17 is illustrated as curve 92. The relationship between the ratio of the speed of motor/generator 50A to the speed of the input member 16 versus the ratio of torque of the input member 16 to torque of the output member 17 is illustrated as curve 94. The relationship between the ratio of the speed of motor/generator 50B to the speed of the input member 16 versus the ratio of torque of the input member 16 to torque of the output member 17 is illustrated as curve 96.

FIG. 2 represents a compound-split operating mode of powertrain 10 assuming no battery power is used, and thus motor/generators 50A and 50B are power-balanced (i.e., the product of the speed and torque of motor/generator 50A is equal to the product of the speed and torque of motor/generator 50B). At point A, in series mode with brake B1 engaged, clutch C1 can be engaged, but it will initially carry no torque and no power as carrier 26 and interconnecting member 72 are stationary. The transition from series mode to compound-split mode occurs at constant transmission torque ratio 1.55 (point A to B), with motor/generator 50A reducing torque and thereby unloading torque on brake B1 and loading torque on clutch C1. At the same time, this increases the fraction of mechanical power directly transferred from engine 12 to output 17 from zero (series mode) to some intermediate split between mechanical and electrical power. When brake B1 is completely unloaded, it is disengaged and the transmission can ratio up or down. In the maneuver represented by FIG. 2, the transmission 14 starts ratioing downward in torque ratio (i.e., to the left in FIG. 2) in compound-split mode after the constant-ratio transition from series operating mode to compound-split operating mode. Alternatively, the motor/generator 50A torque could be reduced to zero by moving down to point C in FIG. 2. At this point, the transmission 14 is in fixed gear mode with 100% mechanical power transfer and no electrical loss. Note that in compound-split mode, there are two other points D and E where there is also 100% mechanical power transfer because one of the motor/generators 50A or 50B is stationary. However, at these points the motor torque is non-zero at the stationary motor, which consumes electrical power from the battery 60.

Figure 3:
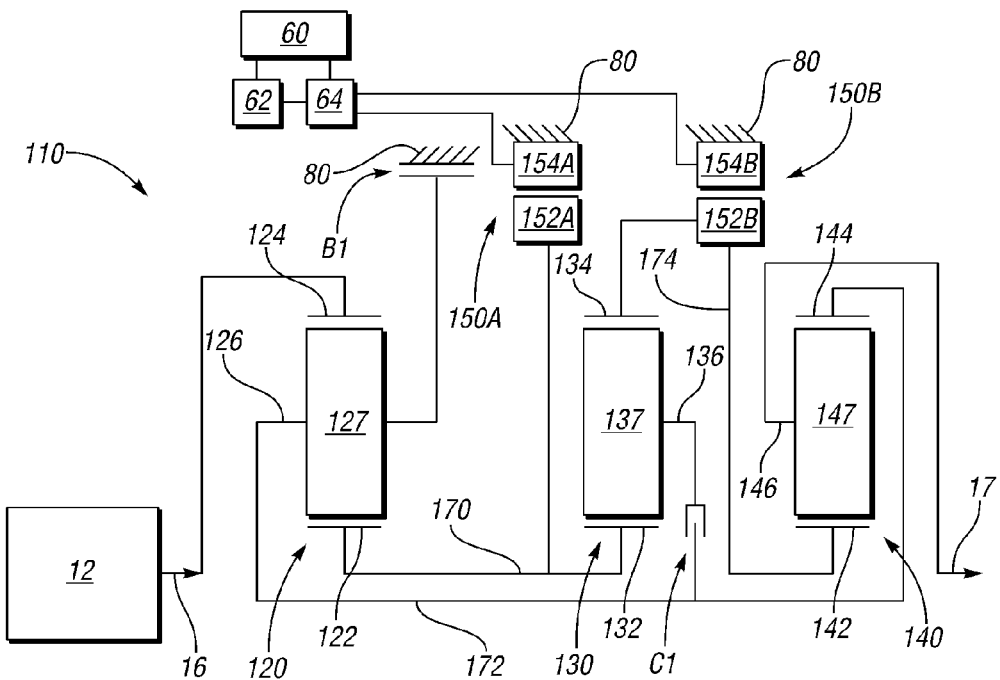
FIG. 3 is a schematic stick diagram illustration of a second embodiment of a hybrid powertrain.

FIG. 3 shows another embodiment of a hybrid powertrain 110 that includes a hybrid transmission 114 and is operable to provide tractive torque at the output member 17 in both a series hybrid operating mode and a compound-split hybrid operating mode, as discussed below. Components that are identical to those in FIGS. 1 and 2 are referred to with identical reference numbers.

The transmission 114 has three planetary gear sets 120, 130 and 140, each of which is a simple planetary gear set. Planetary gear set 120 has a sun gear member 122, a ring gear member 124 and a carrier member 126. Pinion gears 127 rotatably supported on carrier member 126 mesh with both the ring gear member 124 and the sun gear member 122. Planetary gear set 130 has a sun gear member 132, a ring gear member 134 and a carrier member 136. Pinion gears 137 rotatably supported on carrier member 136 mesh with both the ring gear member 134 and the sun gear member 132. Planetary gear set 140 has a sun gear member 142, a ring gear member 144 and a carrier member 146. Pinion gears 147 rotatably supported on carrier member 146 mesh with both the ring gear member 144 and the sun gear member 142. The input member 16 is continuously connected for common rotation with the ring gear member 124. The output member 17 is continuously connected for common rotation with the carrier member 146.

The transmission 114 includes a first motor/generator 150A and a second motor/generator 150B. Motor/generator 150A has a rotor 152A connected for common rotation with ring gear member 134 and a stator 154A grounded to the stationary member 80. Second motor/generator 150B has a rotor 152B and a stator 154B. Stator 154B is grounded to the stationary member 80. The battery 60 is operatively connected by transfer conductors to the stators 154A, 154B. The controller 62 controls electrical transfer between the battery 60 and the stators 154A, 154B through the power inverter 64.

Sun gear member 122 and sun gear member 132 are continuously connected for common rotation with one another and with the rotor 152A by an interconnecting member 170. Carrier member 126 is continuously connected for common rotation with ring gear member 144 by interconnecting member 172. Ring gear member 134 and motor/generator 152B are connected for common rotation with sun gear member 142 by interconnecting member 174.

The transmission 114 includes only the two torque transmitting mechanisms B1 and C1. In this embodiment, brake B1 is selectively engageable to ground the carrier member 126 to the stationary member 80. Clutch C1 is selectively engageable to connect the interconnecting member 172, and thereby the carrier member 126 and the ring gear member 144, for common rotation with the carrier member 136. By controlling the motor/generators 150A, 150B, the clutch C1 and the brake B1, three different operating modes are available for forward propulsion. The motor/generators 150A, 150B may also capture braking energy in a regenerative braking mode and be controlled to start the engine 12 either from a cold start or from a stop/start (i.e., when temporarily shut off while the vehicle is being operated in another mode).

A series operating mode is established by engaging brake B1, not engaging clutch C1 (i.e., disengaging it if previously engaged), controlling motor/generator 150A to function as a generator, and controlling motor/generator 150B to function as a motor. With brake B1 engaged, carrier member 126 and ring gear member 144 are stationary. Torque from the engine 12 is supplied to the rotor 152A at a gear ratio established by the planetary gear set 120. The torque is converted to electrical energy stored in the battery 60 or transmitted directly to motor/generator 150B via 64 to power motor/generator 150B to function as a motor, providing torque at the sun gear member 142. The torque is multiplied through the planetary gear set 140 and provided at the output member 17. Because carrier member 136 is not connected to any other member or to the stationary member 80, planetary gear set 130 is inactive in the series operating mode.

As discussed above, a series operating mode requires two groups of gear members that are connected with one another for power transfer by the electrical connection between the two motor/generators. One group connects the engine 12 with the first motor/generator 150A, and the other group connects the second motor/generator 150B with the output member 17. In the series operating mode, the first group of gear members provides power flow from the engine 12 to the motor/generator 150A (i.e., ring gear member 124, carrier member 126, and interconnected sun gear members 122, 132). The second group of gear members includes those gear members providing a power flow path from the motor/generator 150B to the output member 17 (i.e., interconnected ring gear member 134 and sun gear member 142, carrier member 146, and ring gear member 144). Furthermore, in order to keep motor size relatively small, the motor generator 150B that drives the output member 17 in the series mode should have a geared ratio to the output member 17. This requires a grounded member, in this case ring gear member 144.

A compound-split operating mode is provided when clutch C1 is engaged and brake B1 is not engaged (i.e., disengaging it if previously engaged). A compound-split operating mode requires four planetary gear set members that are not connected for common rotation with one another but that are connected with one another through differential gearing (i.e., one member (ring gear member 124) connected for rotation with the input member 16, a member (interconnected members 122, 132) connected for rotation with the motor/generator 150A, a member (interconnected members 134, 142) connected for rotation with the motor/generator 150B, and a member (carrier member 146) connected for rotation with the output member 17). A fifth member, the carrier member 136, is not connected with any other gear set member in the series operating mode, and thus helps to separate the four required members into a first group and a second group as is necessary in the series operating mode as described above. Clutch C1 can then be engaged to transition to the compound-split operating mode so that the members 126, 136, and 144 are interconnected to function as a single fifth member, and are available to be grounded during a shift to the series operating mode, while still allowing the other four members to be moving, as is required for the series operating mode, thus satisfying the requirement of the compound-split operating mode that there be four members interconnected by differential gearing.

In the compound-split operating mode, the engine 12 provides torque at the ring gear member 124 and the motor/generator 50A provides torque to or receives torque from the sun gear member 122 and sun gear member 132. The torque from the engine 12 and the motor/generator 150A is combined through the planetary gear set 120 to flow to the interconnected carrier member 126, carrier member 136 and ring gear member 144. Torque is provided from or to the motor/generator 50B at the interconnected ring gear member 134 and sun gear member 142. Torque from the engine 12 provided at ring gear member 144 and torque received from or provided to the motor/generator 150B at the sun gear member 142 is split through planetary gear set 140 to provide torque at the carrier member 146 and output member 17. Thus, the torque is split at planetary gear set 120 (input-split) and split again at planetary gear set 140 (output-split), making the operating mode a compound-split operating mode.

A switch from the series operating mode to the compound-split operating mode can occur with a synchronous shift of clutch C1 and brake B1 by controlling the motor/generator 150A to bring the speed of carrier member 136 to the same speed as carrier member 126 (which is a speed of zero in the series operating mode). The gear members that are at zero speed (carrier member 126 and carrier member 136) must be different than the four gear members required for series operation, as all of those gear members must be rotating in the series operating mode. Clutch C1 can then be engaged while brake B1 is released. There is no need to slip clutch C1 as there is no speed differential between the carrier members 126, 136. Thus, there are no mechanical losses due to slipping.

Furthermore, clutch C1 can be engaged at this synchronous speed while B1 remains engaged, establishing a fixed ratio operating mode. For example, if the ring gear member to sun gear member ratio of planetary gear set 120 is 3.0, of planetary gear set 130 is 1.5, and of planetary gear set 140 is 2.0, then if both clutch C1 and brake B1 are engaged, a fixed gear ratio of 1.50 will result between the input member 16 and the output member 17.

When brake B1 is engaged, if the engine 12 is stopped, the motor/generator 150A can be controlled to operate as a motor to start the engine 12. Because clutch C1 is not engaged, planetary gear set 130 is inactive (does not carry torque) and torque is not transferred to the output member 17 while the engine 12 is being started.

During both the series operating mode and the compound-split operating mode, the motor/generator 150B can be controlled to operate as a generator to convert some of the torque at the output member 17 to electrical energy during vehicle braking.

Figure 4:
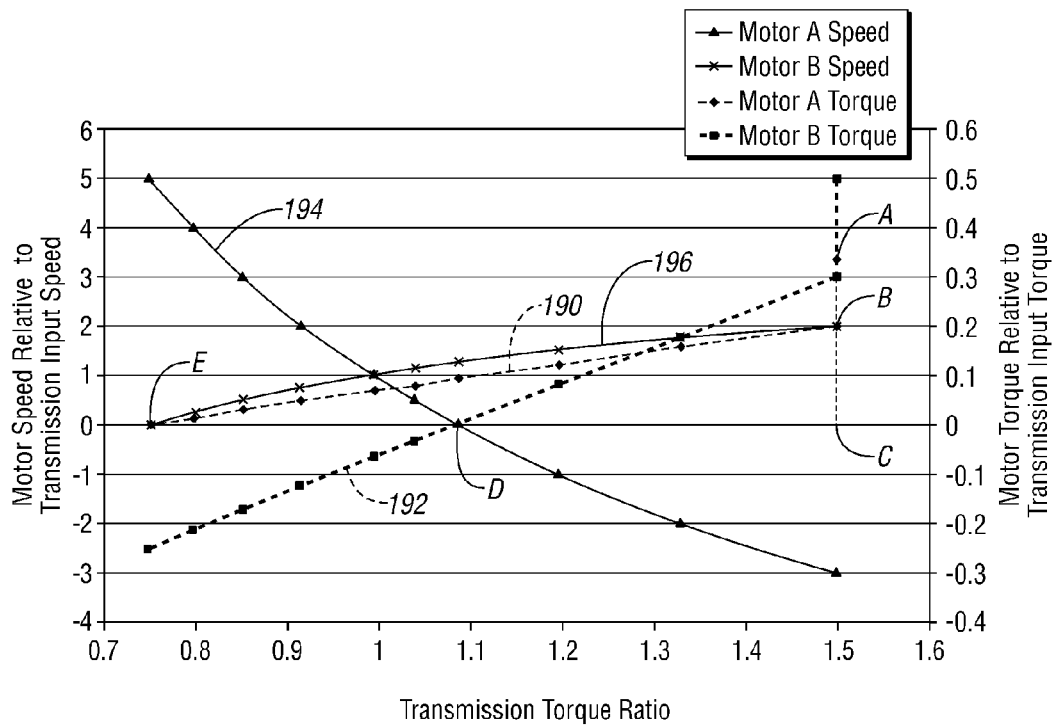
FIG. 4 is a chart of the ratio of motor speed and torque to transmission input and torque versus transmission torque ratio for the powertrain of FIG. 3.

Referring to FIG. 4, the compound-split operating mode is illustrated with the relationship between the ratio of the torque of motor/generator 150A (Motor A) to the torque of the input member 16 versus the ratio of torque of the input member 16 to torque of the output member 17 is illustrated as curve 190. The relationship between the ratio of the torque of motor/generator 150B (Motor B) to the torque of the input member 16 versus the ratio of torque of the input member 16 to torque of the output member 17 is illustrated as curve 192. The relationship between the ratio of the speed of motor/generator 150A to the speed of the input member 16 versus the ratio of torque of the input member 16 to torque of the output member 17 is illustrated as curve 194. The relationship between the ratio of the speed of motor/generator 150B to the speed of the input member 16 versus the ratio of torque of the input member 16 to torque of the output member 17 is illustrated as curve 196. In comparison to the transmission 14 of FIG. 1, transmission 114 has higher speed and lower torque in the compound-split mode.

FIG. 4 represents a compound-split operating mode of powertrain 110 assuming no battery power is used, and thus motor/generators 150A and 150B are power-balanced (i.e., the product of the speed and torque of motor/generator 150A is equal to the product of the speed and torque of motor/generator 150B). At point A, in series mode with brake B1 engaged, clutch C1 can be engaged, but it will initially carry no torque and no power as carrier 126 and interconnecting member 172 are stationary. The transition from series mode to compound-split mode occurs at constant transmission torque ratio 1.5 (point A to B), with motor/generator 150A reducing torque and thereby unloading torque on brake B1 and loading torque on clutch C1. At the same time, this increases the fraction of mechanical power directly transferred from engine 12 to output 17 from zero (series mode) to some intermediate split between mechanical and electrical power. When brake B1 is completely unloaded, it is disengaged and the transmission 114 can ratio up or down. In the maneuver represented by FIG. 4, the transmission 114 starts ratioing downward (i.e., to the left in FIG. 4) in compound-split mode after the constant-ratio transition from series operating mode to compound-split operating mode. Alternatively, the motor/generator 150A torque could be reduced to zero by moving down to point C in FIG. 4. At this point, the transmission 114 is in fixed gear mode with 100% mechanical power transfer and no electrical loss. Note that in compound-split mode, there are two other points D and E where there is also 100% mechanical power transfer because one of the motor/generators 150A or 150B is stationary. However, at these points the motor torque is non-zero at the stationary motor, which consumes electrical power from the battery 60.

Figure 5:
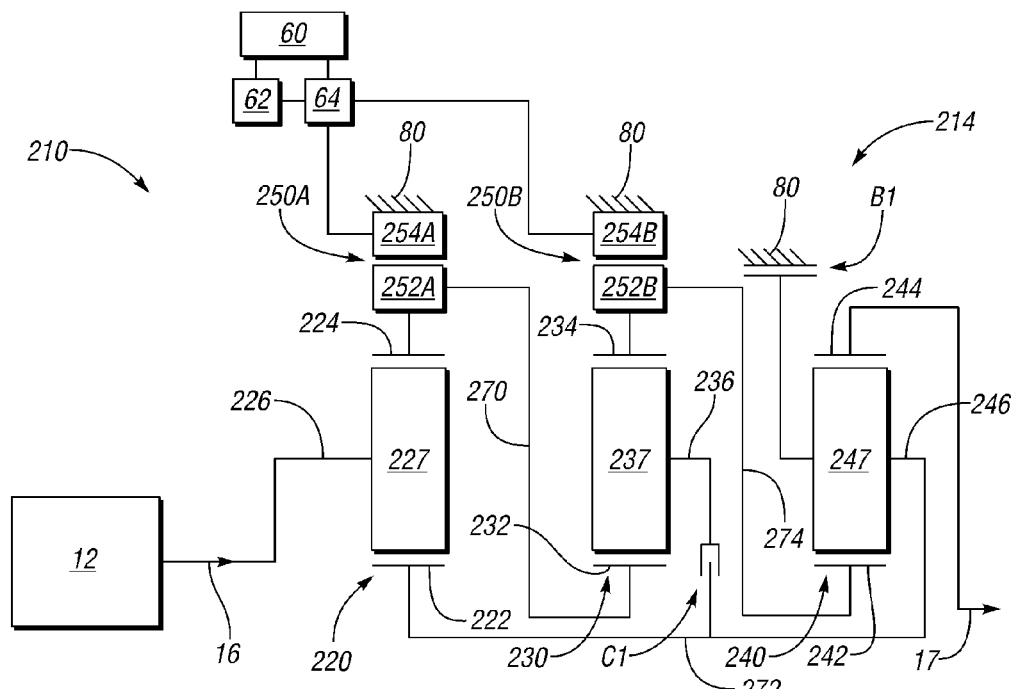
FIG. 5 is a schematic stick diagram illustration of a third embodiment of a hybrid powertrain.

FIG. 5 shows another embodiment of a hybrid powertrain 210 that includes a hybrid transmission 214 and is operable to provide tractive torque at the output member 17 in both a series hybrid operating mode and a compound-split hybrid operating mode, as discussed below. Components that are identical to those in FIGS. 1 and 2 are referred to with identical reference numbers.

The transmission 214 has three planetary gear sets 220, 230 and 240, each of which is a simple planetary gear set. Planetary gear set 220 has a sun gear member 222, a ring gear member 224 and a carrier member 226. Pinion gears 227 rotatably supported on carrier member 226 mesh with both the ring gear member 224 and the sun gear member 222. Planetary gear set 230 has a sun gear member 232, a ring gear member 234 and a carrier member 236. Pinion gears 237 rotatably supported on carrier member 236 mesh with both the ring gear member 234 and the sun gear member 232. Planetary gear set 240 has a sun gear member 242, a ring gear member 244 and a carrier member 246. Pinion gears 247 rotatably supported on carrier member 246 mesh with both the ring gear member 244 and the sun gear member 242. The input member 16 is continuously connected for common rotation with the carrier member 226. The output member 17 is continuously connected for common rotation with the ring gear member 244.

The transmission 214 includes a first motor/generator 250A and a second motor/generator 250B. Motor/generator 250A has a rotor 252A connected for common rotation with ring gear member 224 and a stator 254A grounded to the stationary member 80. Second motor/generator 250B has a rotor 252B connected for common rotation with ring gear member 234 and a stator 254B. Stator 254B is grounded to the stationary member 80. The battery 60 is operatively connected by transfer conductors to the stators 254A, 254B. The controller 62 controls electrical transfer between the battery 60 and the stators 254A, 254B through the power inverter 64.

Ring gear member 224 and sun gear member 232 are continuously connected for common rotation with one another and with the rotor 252A by an interconnecting member 270. Sun gear member 222 is continuously connected for common rotation with carrier member 246 by interconnecting member 272. Ring gear member 234 and motor/generator 252B are connected for common rotation with sun gear member 242 by interconnecting member 274.

The transmission 214 includes only the two torque transmitting mechanisms B1 and C1. In this embodiment, brake B1 is selectively engageable to ground the carrier member 246 to the stationary member 80. Clutch C1 is selectively engageable to connect the interconnecting member 272, and thereby the sun gear member 222 and the ring gear member 246, for common rotation with the carrier member 236. By controlling the motor/generators 250A, 250B, the clutch C1 and the brake B1, three different operating modes are available for forward propulsion. The motor/generators 250A, 250B may also capture braking energy in a regenerative braking mode and be controlled to start the engine 12 either from a cold start or from a stop/start (i.e., when temporarily shut off while the vehicle is being operated in another mode).

A series operating mode is established by engaging brake B1, not engaging clutch C1 (i.e., disengaging it if previously engaged), controlling motor/generator 250A to function as a generator, and controlling motor/generator 250B to function as a motor. With brake B1 engaged, sun gear member 222 and carrier member 246 are stationary. Torque from the engine 12 is supplied to the rotor 252A at a gear ratio established by the planetary gear set 220. The torque is converted to electrical energy stored in the battery 60 or transmitted directly to motor/generator 250B via 64 to power motor/generator 250B to function as a motor, providing torque at the sun gear member 242. The torque is multiplied through the planetary gear set 240 and provided at the output member 17. Because carrier member 236 is not connected to any other member or to the stationary member 80, planetary gear set 230 is inactive in the series operating mode.

As discussed above, a series operating mode requires two groups of gear members that are connected with one another for power transfer only by the electrical connection between the two motor/generators. One group connects the engine 12 with the first motor/generator 250A, and the other group connects the second motor/generator 250B with the output member 17. In the series operating mode, the first group of gear members provides a power flow path from the engine 12 to the motor/generator 250A (i.e., carrier member 226, sun gear member 222, and interconnected ring gear member 224 and sun gear member 232). The second group of gear members provides a power flow path from the motor/generator 250B to the output member 17 (i.e., interconnected ring gear member 234 and sun gear member 242, carrier member 246, ring gear member 244, and carrier member 236, which spins freely in the series operating mode). Furthermore, in order to keep motor size relatively small, the motor generator 250B that drives the output member 17 in the series mode should have a geared ratio to the output member 17. This requires a grounded member, in this case carrier member 246.

A compound-split operating mode is provided when clutch C1 is engaged and brake B1 is not engaged (i.e., disengaging it if previously engaged). A compound-split operating mode requires four planetary gear set members that are not connected for common rotation with one another but that are connected with one another through differential gearing (i.e., one member (carrier member 226) connected for rotation with the input member 16, a member (interconnected members 224, 232) connected for rotation with the motor/generator 250A, a member (interconnected members 234, 242) connected for rotation with the motor/generator 250B, and a member (ring gear member 244) connected for rotation with the output member 17). A fifth member, the carrier member 236, is not connected with any other gear set member in the series operating mode, and thus helps to separate the four required members into a first group and a second group as is necessary in the series operating mode as described above. Clutch C1 can then be engaged to transition to the compound-split operating mode so that the members 222, 236, and 246 are interconnected to function as a single fifth member, and are available to be grounded during a shift to the series operating mode, while still allowing the other four members to be moving, as is required for the series operating mode, thus satisfying the requirement of the compound-split operating mode that there be four members interconnected by differential gearing requirement.

In the compound-split operating mode, the engine 12 provides torque at the carrier member 226 and the motor/generator 250A provides torque to or receives torque from the ring gear member 224 and sun gear member 232. The torque from the engine 12 and the motor/generator 250A is combined through the planetary gear set 120 to flow to the interconnected sun gear member 222, carrier member 236 and carrier member 246. Torque is provided from or to the motor/generator 250B at the interconnected ring gear member 234 and sun gear member 242. Torque from the engine 12 provided at carrier member 246 and torque received from or provided to the motor/generator 250B at the sun gear member 242 is split through planetary gear set 240 to provide torque at the ring gear member 244 and output member 17. Thus, the torque is split at planetary gear set 220 (input-split) and split again at planetary gear set 240 (output-split), making the operating mode a compound-split operating mode.

A switch from the series operating mode to the compound-split operating mode can occur with a synchronous shift of clutch C1 and brake B1 by controlling the motor/generator 250A to bring the speed of carrier member 236 to the same speed as carrier member 246 (which is a speed of zero in the series operating mode). The gear members that are at zero speed (carrier member 236 and carrier member 246) must be different than the four gear members required for series operation, as all of those gear members must be rotating in the series operating mode. Clutch C1 can then be engaged while brake B1 is released. There is no need to slip clutch C1 as there is no speed differential between the carrier members 236, 246. Thus, there are no mechanical losses due to slipping.

Furthermore, clutch C1 can be engaged at this synchronous speed while B1 remains engaged, establishing a fixed ratio operating mode. For example, if the ring gear member to sun gear member ratio of planetary gear set 220 is 2.0, of planetary gear set 230 is 1.5, and of planetary gear set 240 is 2.3, then if both clutch C1 and brake B1 are engaged, a fixed gear ratio of 1.80 will result between the input member 16 and the output member 17.

When brake B1 is engaged, if the engine 12 is stopped, the motor/generator 250A can be controlled to operate as a motor to start the engine 12. Because clutch C1 is not engaged, planetary gear set 230 is inactive (does not carry torque) and torque is not transferred to the output member 17 while the engine 12 is being started.

During both the series operating mode and the compound-split operating mode, the motor/generator 250B can be controlled to operate as a generator to convert some of the torque at the output member 17 to electrical energy during vehicle braking.

Figure 6:
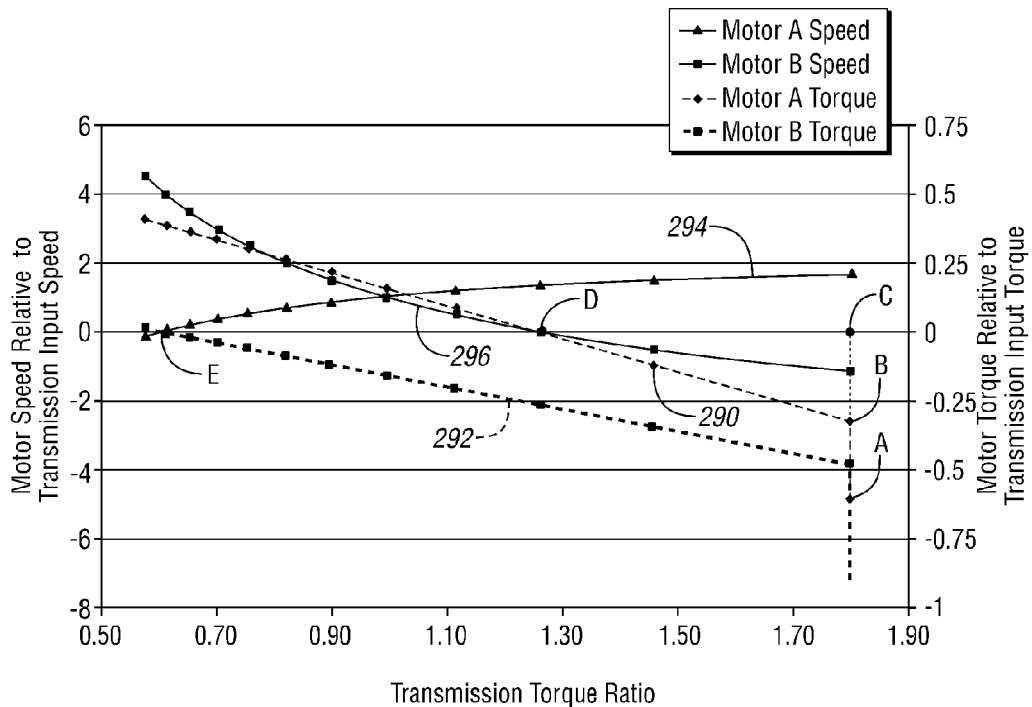
FIG. 6 is a chart of the ratio of motor speed and torque to transmission input and torque versus transmission torque ratio for the powertrain of FIG. 5.

Referring to FIG. 6, the compound-split operating mode is illustrated with the relationship between the ratio of the torque of motor/generator 250A (Motor A) to the torque of the input member 16 versus the ratio of torque of the input member 16 to torque of the output member 17 is illustrated as curve 290. The relationship between the ratio of the torque of motor/generator 250B (Motor B) to the torque of the input member 16 versus the ratio of torque of the input member 16 to torque of the output member 17 is illustrated as curve 292. The relationship between the ratio of the speed of motor/generator 250A to the speed of the input member 16 versus the ratio of torque of the input member 16 to torque of the output member 17 is illustrated as curve 294. The relationship between the ratio of the speed of motor/generator 250B to the speed of the input member 16 versus the ratio of torque of the input member 16 to torque of the output member 17 is illustrated as curve 296. In comparison to the transmission 14 of FIG. 1, transmission 214 has higher motor speeds and lower motor torques in the compound-split mode.

FIG. 6 represents a compound-split operating mode of powertrain 210 assuming no battery power is used, and thus motor/generators 250A and 250B are power-balanced (i.e., the product of the speed and torque of motor/generator 250A is equal to the product of the speed and torque of motor/generator 250B). At point A, in series mode with brake B1 engaged, clutch C1 can be engaged, but it will initially carry no torque and no power as carrier 246 and interconnecting member 272 are stationary. The transition from series mode to compound-split mode occurs at constant transmission torque ratio 1.8 (point A to B), with motor/generator 250A reducing torque and thereby unloading torque on brake B1 and loading torque on clutch C1. At the same time, this increases the fraction of mechanical power directly transferred from engine 12 to output 17 from zero (series mode) to some intermediate split between mechanical and electrical power. When brake B1 is completely unloaded, it is disengaged and the transmission 214 can ratio up or down. In the maneuver represented by FIG. 6, the transmission 214 starts ratioing downward in torque ratio (i.e., to the left in FIG. 6) in compound-split mode after the constant-ratio transition from series operating mode to compound-split operating mode. Alternatively, the motor/generator 250A torque could be reduced to zero by moving up to point C in FIG. 6. At this point, the transmission 214 is in fixed gear mode with 100% mechanical power transfer and no electrical loss. Note that in compound-split mode, there are two other points D and E where there is also 100% mechanical power transfer because one of the motor/generators 250A or 250B is stationary. However, at these points the motor torque is non-zero at the stationary motor, which consumes electrical power from the battery 60.

Figure 7:
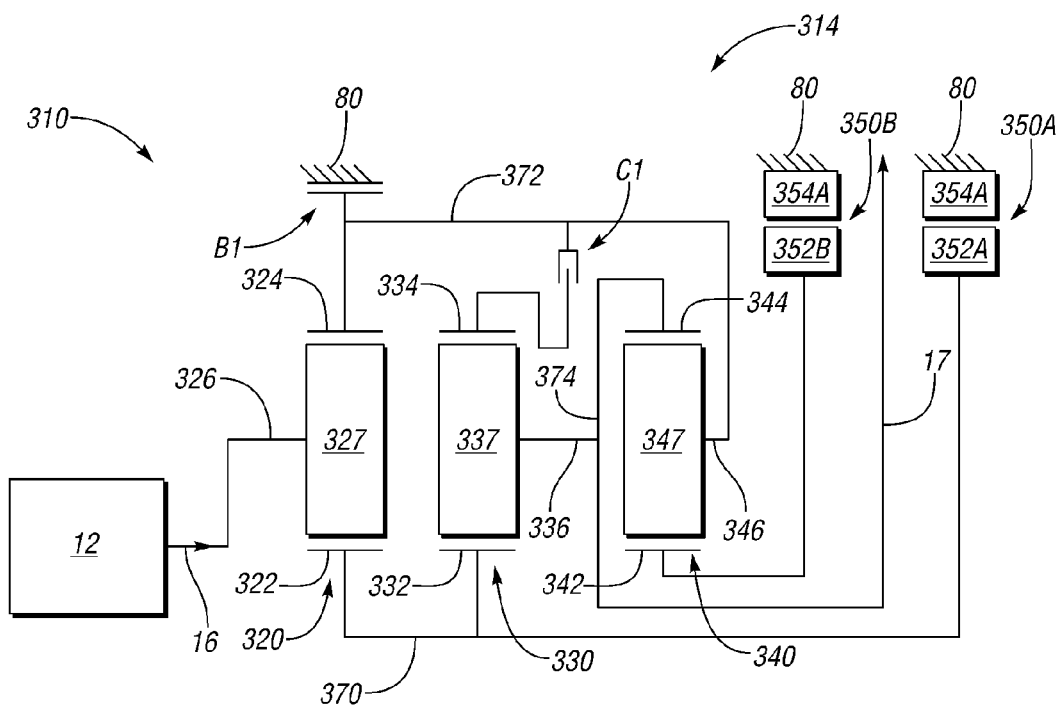
FIG. 7 is a schematic stick diagram illustration of a fourth embodiment of a hybrid powertrain.

FIG. 7 shows another embodiment of a hybrid powertrain 310 that includes a hybrid transmission 314 and is operable to provide tractive torque at the output member 17 in both a series hybrid operating mode and a compound-split hybrid operating mode, as discussed below. Components that are identical to those in FIGS. 1 and 2 are referred to with identical reference numbers.

The transmission 314 has three planetary gear sets 320, 330 and 340, each of which is a simple planetary gear set. Planetary gear set 320 has a sun gear member 322, a ring gear member 324 and a carrier member 326. Pinion gears 327 rotatably supported on carrier member 326 mesh with both the ring gear member 324 and the sun gear member 322. Planetary gear set 330 has a sun gear member 332, a ring gear member 334 and a carrier member 336. Pinion gears 337 rotatably supported on carrier member 336 mesh with both the ring gear member 334 and the sun gear member 332. Planetary gear set 340 has a sun gear member 342, a ring gear member 344 and a carrier member 346. Pinion gears 347 rotatably supported on carrier member 346 mesh with both the ring gear member 344 and the sun gear member 342. The input member 16 is continuously connected for common rotation with the carrier member 326. The output member 17 is continuously connected for common rotation with the ring gear member 344.

The transmission 314 includes a first motor/generator 350A and a second motor/generator 350B. Motor/generator 350A has a rotor 352A connected for common rotation with sun gear member 332 and a stator 354A grounded to the stationary member 80. Second motor/generator 350B has a rotor 352B and a stator 354B. Stator 354B is grounded to the stationary member 80. The battery 60 is operatively connected by transfer conductors to the stators 354A, 354B. The controller 62 controls electrical transfer between the battery 60 and the stators 354A, 354B through the power inverter 64.

Sun gear member 322 and sun gear member 332 are continuously connected for common rotation with one another and with the rotor 352A by an interconnecting member 370. Ring gear member 324 is continuously connected for common rotation with carrier member 346 by interconnecting member 372. Ring gear member 344 and carrier member 336 are connected for common rotation with output member 17 by interconnecting member 374.

The transmission 314 includes only the two torque transmitting mechanisms B1 and C1. In this embodiment, brake B1 is selectively engageable to ground the carrier member 346 and ring gear member 324 to the stationary member 80. Clutch C1 is selectively engageable to connect the interconnecting member 372, and thereby the ring gear member 324 and the carrier member 346, for common rotation with the ring gear member 334. By controlling the motor/generators 350A, 350B, the clutch C1 and the brake B1, three different operating modes are available for forward propulsion. The motor/generators 350A, 350B may also capture braking energy in a regenerative braking mode and be controlled to start the engine 12 either from a cold start or from a stop/start (i.e., when temporarily shut off while the vehicle is being operated in another mode).

A series operating mode is established by engaging brake B1, not engaging clutch C1 (i.e., disengaging it if previously engaged), controlling motor/generator 350A to function as a generator, and controlling motor/generator 350B to function as a motor. With brake B1 engaged, ring gear member 324 and carrier member 346 are stationary. Torque from the engine 12 is supplied to the rotor 352A at a gear ratio established by the planetary gear set 320. The torque is converted to electrical energy stored in the battery 60 or transmitted directly to motor/generator 350B via 64 to power motor/generator 350B to function as a motor, providing torque at the sun gear member 342. The torque is multiplied through the planetary gear set 340 and provided at the output member 17. Because ring gear member 334 is not connected to any other member or to the stationary member 80, planetary gear set 330 is inactive in the series operating mode.

As discussed above, a series operating mode requires two groups of gear members that are connected with one another for power transfer only by the electrical connection between the two motor/generators. One group establishes a power flow path from the engine 12 to the first motor/generator 350A, and the other group establishes a power flow path from the second motor/generator 350B to the output member 17. In the series operating mode, the gear members of the first group include carrier member 326, interconnected sun gear member 322 and sun gear member 332, and ring gear member 324. The gear members of the second group include sun gear member 342, interconnected ring gear member 344 and carrier member 336, carrier member 346, and ring gear member 334, which spins freely in the series operating mode. Furthermore, in order to keep motor size relatively small, the motor generator 350B that drives the output member 17 in the series mode should have a geared ratio to the output member 17. This requires a grounded member, in this case carrier member 346.

A compound-split operating mode is provided when clutch C1 is engaged and brake B1 is not engaged (i.e., disengaging it if previously engaged). A compound-split operating mode requires four planetary gear set members that are not connected for common rotation with one another but that are connected with one another through differential gearing (i.e., one member (carrier member 326) connected for rotation with the input member 16, a member (interconnected members 322, 332) connected for rotation with the motor/generator 350A, a member (sun gear member 342) connected for rotation with the motor/generator 350B, and a member (interconnected ring gear member 344 and carrier member 336) connected for rotation with the output member 17). A fifth member, the ring gear member 334, is not connected with any other gear set member in the series operating mode, and thus helps to separate the four required members into a first group and a second group as is necessary in the series operating mode as described above. Clutch C1 can then be engaged to transition to the compound-split operating mode so that the members 324, 334, and 346 are interconnected to function as a single fifth member, and are available to be grounded during a shift to the series operating mode, while still allowing the other four members to be moving, as is required for the series operating mode, thus satisfying the requirement of the compound-split operating mode that there be four members interconnected by differential gearing.

In the compound-split operating mode, the engine 12 provides torque at the carrier member 326 and the motor/generator 350A provides torque to or receives torque from the sun gear member 322 and sun gear member 332. The torque from the engine 12 and the motor/generator 350A is combined through the planetary gear set 320 to flow to the interconnected ring gear member 324 and carrier member 346. Torque is provided from or to the motor/generator 350B at sun gear member 342. Torque from the engine 12 provided at carrier member 346 and torque received from or provided to the motor/generator 350B at the sun gear member 342 is split through planetary gear set 340 to provide torque at the ring gear member 344 and output member 17. Thus, the torque is split at planetary gear set 320 (input-split) and split again at planetary gear set 340 (output-split), making the operating mode a compound-split operating mode.

A switch from the series operating mode to the compound-split operating mode can occur with a synchronous shift of clutch C1 and brake B1 by controlling the motor/generator 350A to bring the speed of ring gear member 334 to the same speed as ring gear member 324 (which is a speed of zero in the series operating mode). The gear members that are at zero speed (ring gear member 324 and ring gear member 334) must be different than the four gear members required for series operation, as all of those gear members must be rotating in the series operating mode. Thus, the synchronous shift can occur by bringing the speed of ring gear member 324 to the same speed as ring gear member 334 while in the series operating mode by controlling the speed of motor/generator 350A. Clutch C1 can then be engaged while brake B1 is released. There is no need to slip clutch C1 as there is no speed differential between the ring gear members 324, 334. Thus, there are no mechanical losses due to slipping.

Furthermore, clutch C1 can be engaged at this synchronous speed while B1 remains engaged, establishing a fixed ratio operating mode. For example, if the ring gear member to sun gear member ratio of planetary gear set 320 is 2.0, of planetary gear set 330 is 1.5, and of planetary gear set 340 is 2.3, then if both clutch C1 and brake B1 are engaged, a fixed gear ratio of 1.40 will result between the input member 16 and the output member 17.

When brake B1 is engaged, if the engine 12 is stopped, the motor/generator 350A can be controlled to operate as a motor to start the engine 12. Because clutch C1 is not engaged, planetary gear set 330 is inactive (does not carry torque) and torque is not transferred to the output member 17 while the engine 12 is being started.

During both the series operating mode and the compound-split operating mode, the motor/generator 350B can be controlled to operate as a generator to convert some of the torque at the output member 17 to electrical energy during vehicle braking.

Figure 8:
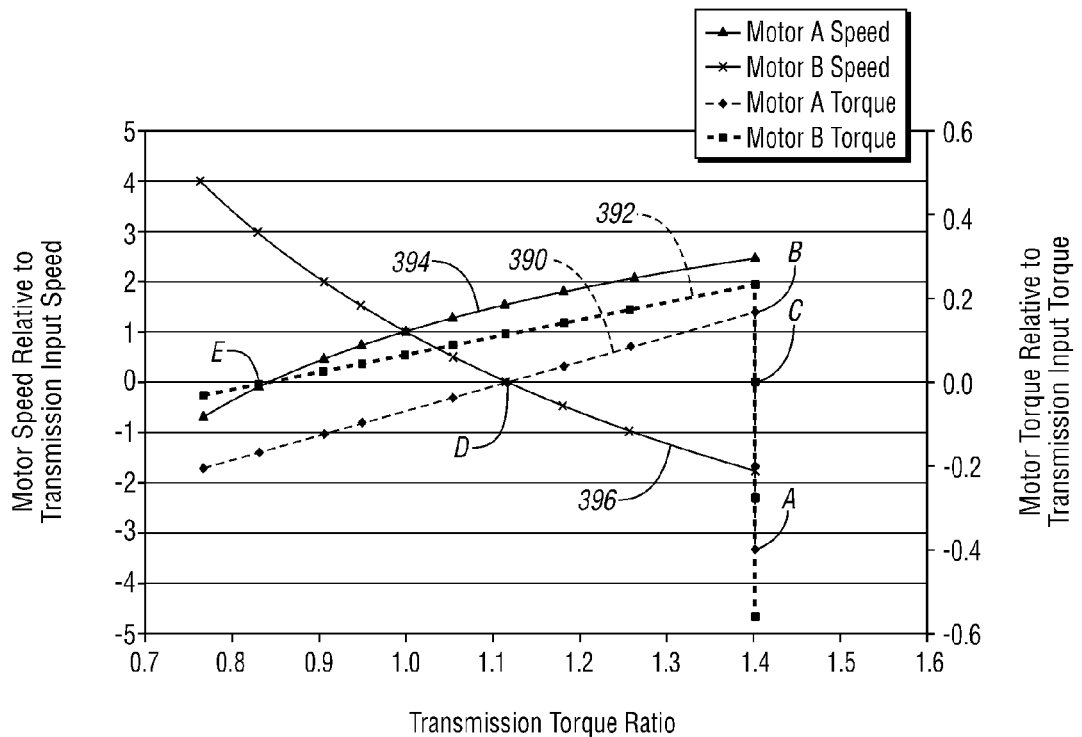
FIG. 8 is a chart of the ratio of motor speed and torque to transmission input and torque versus transmission torque ratio for the powertrain of FIG. 7.

Referring to FIG. 8, the compound-split operating mode is illustrated with the relationship between the ratio of the torque of motor/generator 350A (Motor A) to the torque of the input member 16 versus the ratio of torque of the input member 16 to torque of the output member 17 is illustrated as curve 390. The relationship between the ratio of the torque of motor/generator 350B (Motor B) to the torque of the input member 16 versus the ratio of torque of the input member 16 to torque of the output member 17 is illustrated as curve 392. The relationship between the ratio of the speed of motor/generator 350A to the speed of the input member 16 versus the ratio of torque of the input member 16 to torque of the output member 17 is illustrated as curve 394. The relationship between the ratio of the speed of motor/generator 350B to the speed of the input member 16 versus the ratio of torque of the input member 16 to torque of the output member 17 is illustrated as curve 396. In comparison to the transmission 14 of FIG. 1, transmission 314 has, generally, higher motor speeds and lower motor torques in the compound-split mode.

FIG. 8 represents a compound-split operating mode of powertrain 310 assuming no battery power is used, and thus motor/generators 350A and 350B are power-balanced (i.e., the product of the speed and torque of motor/generator 350A is equal to the product of the speed and torque of motor/generator 350B). At point A, in series mode with brake B1 engaged, clutch C1 can be engaged, but it will carry no torque as carrier 346 and interconnecting member 372 are stationary. The transition from series mode to compound-split mode occurs at constant transmission torque ratio 1.4 (point A to B), with motor/generator 350A reducing torque and thereby unloading torque on brake B1 and loading torque on clutch C1. Motor/generator 350A does a torque reversal when slewing torque from point A to point B. At the same time, this increases the fraction of mechanical power directly transferred from engine 12 to output 17 from zero (series mode) to some intermediate split between mechanical and electrical power. When brake B1 is completely unloaded, it is disengaged and the transmission 314 can ratio up or down. In the maneuver represented by FIG. 8, the transmission 314 starts ratioing downward (i.e., to the left in FIG. 8) in compound-split mode after the constant-ratio transition from series operating mode to compound-split operating mode. Alternatively, the motor/generator 350A torque could be held at zero moving only from point A to point C in FIG. 8. At this point, the transmission 314 is in fixed gear mode with 100% mechanical power transfer and no electrical loss. Note that in compound-split mode, there are two other points D and E where there is also 100% mechanical power transfer because one of the motor/generators 350A or 350B is stationary. However, at these points the motor torque is non-zero at the stationary motor, which consumes electrical power from the battery 60.

While the best modes for carrying out the invention have been described in detail, those familiar with the art to which this invention relates will recognize various alternative designs and embodiments for practicing the invention within the scope of the appended claims.

The invention claimed is:

1. A hybrid transmission operatively connected with an engine, comprising:
    an input member operatively connected with the engine;
    an output member;
    a plurality of selectively engageable torque-transmitting mechanisms;
    a gearing arrangement;
    first and second motor/generators operatively connected with the gearing arrangement;
    wherein a first of the torque-transmitting mechanisms is engaged to establish a hybrid series operating mode between the input member and the output member;
    wherein only a second of the torque-transmitting mechanisms is engaged to establish a compound-split operating mode between the input member and the output member;
    wherein a shift between the hybrid series operating mode and the compound-split operating mode is synchronous without slipping the torque-transmitting mechanisms;
    wherein the gearing arrangement includes multiple planetary gear sets, each planetary gear set having multiple gear members; wherein powerflow from a first group of the gear members to a second group of the gear members is via an electrical path through the motor/generators in the series operating mode; and wherein powerflow from the first group of gear members to the second group of gear members is via a mechanical path established by engaging the second torque-transmitting mechanism in the compound-split operating mode;
    wherein the planetary gear sets include a first, a second and a third planetary gear set; wherein the input member is connected for common rotation with a first member of the first planetary gear set; wherein the first motor/generator is connected for common rotation with a second member of the first planetary gear set and with a first member of the second planetary gear set; wherein the third member of the first planetary gear set is selectively grounded to the stationary member by engagement of the first torque-transmitting mechanism and is continuously connected for common rotation with the first member of the third planetary gear set;
    wherein the second motor/generator is continuously connected for common rotation with the second member of the second planetary gear set and with the second member of the third planetary gear set; wherein the output member is continuously connected for common rotation with the third member of the third planetary gear set; and wherein the second torque-transmitting mechanism is selectively engageable to connect the third member of the second planetary gear set for common rotation with the interconnected third member of the first planetary gear set and first member of the third planetary gear set.

2. The hybrid powertrain of claim 1, wherein the plurality of selectively engageable torque-transmitting mechanisms includes only the first and the second torque-transmitting mechanisms.

3. The hybrid powertrain of claim 1, wherein the first member of the first planetary gear set is a ring gear member, the second member of the first planetary gear set is a sun gear member, and the third member of the first planetary gear set is a carrier member; and wherein the first member of the third planetary gear set is a ring gear member, the second member of the third planetary gear set is a sun gear member, and the third member of the third planetary gear set is a carrier member.

4. The hybrid powertrain of claim 3, wherein the first member of the second planetary gear set is a ring gear member, the second member of the second planetary gear set is a sun gear member, and the third member of the second planetary gear set is a carrier member.

5. The hybrid powertrain of claim 3, wherein the first member of the second planetary gear set is a sun gear member, the second member of the second planetary gear set is a ring gear member, and the third member of the second planetary gear set is a carrier member.

6. The hybrid powertrain of claim 1, wherein the first member of the first planetary gear set is a carrier member, the second member of the first planetary gear set is a ring gear member, and the third member of the first planetary gear set is a sun gear member; wherein the first member of the second planetary gear set is a sun gear member, the second member of the second planetary gear set is a ring gear member, and the third member of the second planetary gear set is a carrier member; and wherein the first member of the third planetary gear set is a carrier member, the second member of the third planetary gear set is a sun gear member, and the third member of the third planetary gear set is a ring gear member.

7. The hybrid powertrain of claim 1, wherein the first member of the first planetary gear set is a carrier member, the second member of the first planetary gear set is a sun gear member, and the third member of the first planetary gear set is a ring gear member; wherein the first member of the of the second planetary gear set is a sun gear member, the second member of the second planetary gear set is a carrier member, and the third member of the second planetary gear set is a ring gear member; and wherein the first member of the third planetary gear set is a carrier member, the second member of the third planetary gear set is a sun gear member, and the third member of the third planetary gear set is a ring gear member.

8. The hybrid powertrain of claim 1, wherein the first motor/generator is operable to start the engine when the first torque-transmitting mechanism is engaged and the second torque-transmitting mechanism is not engaged.

9. A hybrid transmission operatively connected with an engine, comprising:
an input member operatively connected with the engine;
an output member;
a stationary member;
a first and a second selectively engageable torque-transmitting mechanism;
a first, a second and a third planetary gear set, each having a first member, a second member and a third member; wherein the transmission has no other planetary gear sets;
first and second motor/generators;
wherein the input member is connected for common rotation with a first member of the first planetary gear set; wherein the first motor/generator is connected for common rotation with a second member of the first planetary gear; wherein the third member of the first planetary gear set is selectively grounded to the stationary member by engagement of the first torque-transmitting mechanism;
wherein the second motor/generator is continuously connected for common rotation with the second member of one the second and the third planetary gear set; wherein the output member is continuously connected for common rotation with the third member of the third planetary gear set;
a first interconnecting member continuously connecting the second member of the first planetary gear set for common rotation with the first member of the second planetary gear set;
a second interconnecting member continuously connecting the third member of the first planetary gear set for common rotation with the first member of the third planetary gear set;
a third interconnecting member continuously connecting the second member of the second planetary gear set for common rotation with one of the second and the third member of the third planetary gear set;
wherein the first torque-transmitting mechanism is selectively engageable to ground the third member of the first planetary gear set to the stationary member;
wherein the second torque-transmitting mechanism is selectively engageable to connect the third member of the second planetary gear set for common rotation with the second interconnecting member;
wherein the first torque-transmitting mechanism is engaged to establish a hybrid series operating mode between the input member and the output member;
wherein the second torque-transmitting mechanism is engaged to establish a compound-split operating mode between the input member and the output member; and
wherein a shift between the hybrid series operating mode and the compound-split operating mode is synchronous without slipping the torque-transmitting mechanisms.

10. The hybrid transmission of claim 9, wherein the first member of the first planetary gear set is a ring gear member, the second member of the first planetary gear set is a sun gear member, and the third member of the first planetary gear set is a carrier member; and wherein the first member of the third planetary gear set is a ring gear member, the second member of the third planetary gear set is a sun gear member, and the third member of the third planetary gear set is a carrier member.

11. The hybrid transmission of claim 9, wherein the first member of the second planetary gear set is a ring gear member, the second member of the second planetary gear set is a sun gear member, and the third member of the second planetary gear set is a carrier member.

12. The hybrid transmission of claim 9, wherein the first member of the second planetary gear set is a sun gear member, the second member of the second planetary gear set is a ring gear member, and the third member of the second planetary gear set is a carrier member.

13. The hybrid transmission of claim 9, wherein the first member of the first planetary gear set is a carrier member, the second member of the first planetary gear set is a ring gear member, and the third member of the first planetary gear set is a sun gear member; wherein the first member of the of the second planetary gear set is a sun gear member, the second member of the second planetary gear set is a ring gear member, and the third member of the second planetary gear set is a carrier member; and wherein the first member of the third planetary gear set is a carrier member, the second member of the third planetary gear set is a sun gear member, and the third member of the third planetary gear set is a ring gear member.

14. The hybrid transmission of claim 9, wherein the first member of the first planetary gear set is a carrier member, the second member of the first planetary gear set is a sun gear member, and the third member of the first planetary gear set is a ring gear member; wherein the first member of the of the second planetary gear set is a sun gear member, the second member of the second planetary gear set is a carrier member, and the third member of the second planetary gear set is a ring gear member; and wherein the first member of the third planetary gear set is a carrier member, the second member of the third planetary gear set is a sun gear member, and the third member of the third planetary gear set is a ring gear member.

15. A hybrid transmission operatively connected with an engine, comprising:
- an input member operatively connected with the engine;
- an output member;
- a stationary member;
- only two selectively engageable torque-transmitting mechanisms;
- a gearing arrangement including nine rotatable gear elements;
- first and second motor/generators; wherein the first motor/generator is continuously connected for common rotation with a first and a second of the nine gear elements;
- wherein the second motor/generator is continuously connected for common rotation with at least one of a third and a fourth of the nine gear elements; wherein the input member and the output member are continuously connected for common rotation with a fifth and a sixth of the nine gear elements, respectively; wherein the fifth and the sixth of the nine gear elements are not continuously for common rotation with either of the motor/generators;
- wherein a first of the torque-transmitting mechanisms is engaged to connect a seventh and an eighth of the nine gear elements to the stationary member to establish a hybrid series operating mode between the input member and the output member;
- wherein a second of the torque-transmitting mechanisms is engaged to connect a ninth of the gear elements for common rotation with the seventh and the eighth gear elements to establish a compound-split operating mode between the input member and the output member; and
- wherein a shift between the hybrid series operating mode and the compound-split operating mode is synchronous without slipping the torque-transmitting mechanisms.

* * * * *